United States Patent [19]

Ohuchi

[11] Patent Number: 4,798,468
[45] Date of Patent: Jan. 17, 1989

[54] INTERFERENCE APPARATUS FOR DETECTING STATE OF WAVE SURFACE

[75] Inventor: Chidane Ohuchi, Hino, Japan

[73] Assignee: Canon Kabushiki Kaisha, Tokyo, Japan

[21] Appl. No.: 864,148

[22] Filed: May 16, 1986

[30] Foreign Application Priority Data

May 28, 1985 [JP] Japan ................................ 60-114730

[51] Int. Cl.$^4$ .............................................. G01B 9/02
[52] U.S. Cl. ................................... 356/351; 356/359; 356/360
[58] Field of Search .................... 356/351, 360, 359

[56] References Cited

U.S. PATENT DOCUMENTS 4,583,855 4/1986 Bareket .......................... 356/359 X

OTHER PUBLICATIONS

"Digital Wavefront Measuring Interferometer for Testing Optical Surfaces and Lenses", Bruning et al., Applied Optics, 11-1974, pp. 2693-2703.

Primary Examiner—Vincent P. McGraw
Assistant Examiner—S. A. Turner
Attorney, Agent, or Firm—Fitzpatrick, Cella, Harper & Scinto

[57] ABSTRACT

A plurality of interference beams are obtained by making a pair of beams of reference and test-sample light diverge into a plurality of optical paths; providing phase difference between reference and test-sample beams constituting each of a plurality of pairs of reference and test-sample beams having traveled on the plurality of optical paths. The plurality of interference beams are respectively received by light receiving means such as image pickup elements, and the phase difference between the beams of reference and test-sample light is obtained on the basis of signals relating to the plurality of interference beams supplied from the light receiving means, thus obtaining the state of a wave surface of the test-sample beam. By this intereference apparatus, it is possible for the state of the wave surface to be detected correctly even when the output of a light source such as an eximer layer fluctuates, and it is possible to provide an interference apparatus of a phase modulation interference type which does not need substantially any driving mechanism.

8 Claims, 5 Drawing Sheets

INTERFERENCE APPARATUS FOR DETECTING STATE OF WAVE SURFACE

BACKGROUND OF THE INVENTION

1. Field of the Invention

The present invention relates to an interference apparatus for detecting the state of a wave surface capable of speedily and accurately detecting phase differences as between beams of reference light and test-sample light over a certain range and relates more particularly to an interference apparatus for detecting the state of a wave surface capable of detecting with consistently high accuracy the phase difference as between beams of reference light and test-sample light even when the output from a light source fluctuates.

2. Description of the Prior art

Various interferometers such as Twyman interferometers and Mach-Zehnder interferometers have been utilized in measuring optical performance and specifically wave front aberrations of optical devices such as image pickup lenses. Apparatuses of these kinds include a so-called phase modulation interference type of measuring apparatus which measures the optical performance of an object of measurement by detecting the phase difference between beams of reference light and test-sample light which have passed through the object, that is, detecting interference fringes in a time division manner. This type of apparatus has generally been used because they normally have a simple form of construction and are capable of performing measurement with high accuracy. They detect in time division manner brightness variations of interference fringes which are formed on a light receiving surface when, for example, a reflecting mirror and the like disposed on the optical path for reference light is vibrated to a minute degree. Accordingly, brightness variations which are caused by factors other than the change of the optical path act as noises and reduce the measurement accuracy. Specifically, in this type of apparatus, the output of a light source must be maintained at a constant level. It has thus been difficult for a light source having varying output to be adapted for use in this type of apparatus.

However, a light source having a specific wave length corresponding to that of an object device has sometimes been needed if the performance of the object of measurement is to be measured at its specific operating wave length even when the output of the light source is to some extent unstable.

For the purpose of measuring the performance of the object of measurement in, for example, an ultraviolet radiation range, it is effective to use an eximer laser because it is capable of emitting various spectra of light in the ultraviolet radiation range and of readily outputting this light at a high level. The output of the eximer laser, however, is unstable, so that, for the above-described reason, this laser reduces the accuracy of a measuring apparatus of the phase modulation interference method when directly incorporated in this apparatus.

SUMMARY OF THE INVENTION

An object of the present invention is to provide an interference apparatus for detecting the state of a wave surface which is capable of measuring with consistently high accuracy the optical performance of an object of measurement even if the output from a light source fluctuates when the optical performance is measured by detecting the phase difference between beams of reference light and test-sample light. Another object of the present invention is to provide an interference apparatus for detecting the state of a wave surface which is capable of detecting with consistently high accuracy the phase difference between beams of reference light and test-sample light when the optical performance of an object of measurement is measured in an ultraviolet radiation range by using a light source producing beams whose intensity and space intensity distribution fluctuate each time a variation of a beam is output, such as an eximer laser which outputs pulse-oscillation light of various wavelengths in an ultraviolet radiation range.

To these ends, an interference apparatus according to the present invention comprises: means for making a pair of beams of reference light and test-sample light diverge to become a plurality of pairs of beams travelling on a plurality of optical paths; means for giving a differentiated value of phase difference to a pair of the plurality of reference and test-sample beams travelling on each of the pairs of plurality of optical paths; means for thereafter making each pair of reference and test-sample beams interfere with each other and enter into a light receiving means having a given light receiving area and disposed on each of the pairs of diverged optical paths; and means for obtaining the phase difference between the beams of reference light and test-sample light at points located on each light receiving surface of the light receiving means and optically corresponding to each other, by using signals supplied from these corresponding points.

DESCRIPTION OF THE PREFERRED EMBODIMENTS

Figure 1:
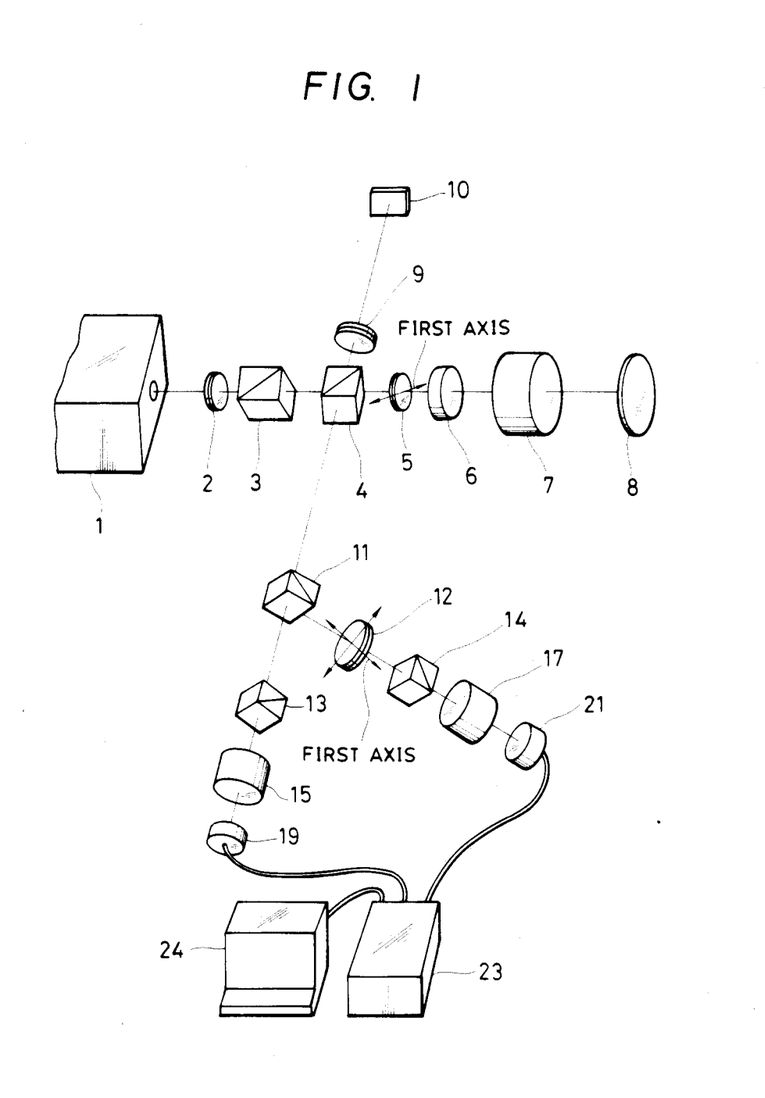
FIG. 1 is a schematic diagram showing the optical system of an interference apparatus which is an embodiment of the present invention.

FIG. 1 schematically shows an optical system in accordance with an embodiment of the present invention, in which a plane of polarization of a beam emitted from a light source 1 such as an eximer laser is changed by an optical element 2 such as a one-half wave plate or a asimuthal element; polarization components vibrating in a given direction only are permitted to pass through a polarizer 3; a beam of polarized light having passed through the polarizer 3 diverges to become two beams of linearly polarized light consisting of reference light and test-sample light when it passes through a polarizing beam splitter 4; a beam of polarized light having passed through the polarizing beam splitter 4 becomes a beam of circularly polarized light when it passes through a one-fourth wave plate 5; this beam passes through a condenser lens 6 and a test-sample lens 7 provided as an object of measurement and is reflected on a concave mirror 8; and a beam of light reflected on the polarizing beam splitter 4 becomes a circularly polarized light when it passes through a one-fourth wave plate 9. A reference numeral 10 denotes a reference light plane mirror, and a numeral 11 denotes a non-polarizing beam splitter.

According to the arrangement of this embodiment, a beam which has passed through a polarizing beam splitter 4 travels reciprocatively on a orthtomic polarized wave surface which includes the test-sample lens 7 and it is reflected on the polarizing beam splitter 4, thus obtaining the test-sample light. A beam reflected on the polarizing beam splitter 4 travels reciprocatively on the reference light optical path including the plane mirror 10 and passes through the polarizing beam splitter 4, thus obtaining the reference light. Thus, both beams of reference and test-sample light are emitted from the polarizing beam splitter 4.

That is, as shown in FIG. 1, a beam emitted from the light source 1 passes through the optical element 2 such as a one-half wave plate and the polarizer 3 whose azimuths are properly adjusted, so that it becomes a beam of linearly polarized light having an azimuth of 45° relative to the orthogonally polarizing surface of the polarizing beam splitter 4. The S-component of linearly polarized light in this beam of linearly polarized light is reflected on the polarizing beam splitter 4, thereby becoming the reference light, and it passes through the one-fourth wave length plate 9 and becomes a beam of circularly polarized light. This beam then reflects on the plane mirror 10 and again passes through the one-fourth wave plate 9, thereby becoming a beam of linearly polarized light which is perpendicular to what this beam was at the time of incidence. On the other hand, the P-component of linearly polarized light passes through the polarizing beam splitter 4 and becomes the test-sample light. This beam passes through the one-fourth wave plate 5 and becomes a beam of circularly polarized light, and the beam is thereafter converged by the condenser lens 6 on the focal point thereof. This focal point corresponds to the applied image surface of the test-sample lens 7. The beam which has passed through this test-sample lens 7 converges on the applied object surface of this test-sample lens 7 located between this lens and the concave mirror 8. This applied object surface corresponds to the center of curvature of this concave mirror 8. The beam reflected on the concave mirror 8 retrogresses and passes through the one-fourth wave plate 5 again. At this time, the test-sample light becomes a beam of linearly polarized light which vibrates in the direction perpendicular to that assumed at the time of incidence, and this beam is reflected by the polarizing beam splitter 4. Then, a pair of the beams of reference and test-sample light which are polarized in parallel relationship with each other issue from the polarizing beam splitter 4 and advance toward the non-polarizing beam splitter 11.

In this arrangement, as described above, a beam having given planes of polarization passes through the one-half wave plate 2 and the polarizer 3, and a beam of linearly polarized light having an azimuth of 45° relative to the orthogonally polarizing surface of the polarizing beam splitter 4 is thereby obtained, thus equalizing the values of intensity of beams travelling to the concave mirror 8 and the plane mirror 10. If the amounts of loss of beams travelling on the orthtomic polarized wave surface and the referring optical path are either small or equal or non-existent, the intensity ratio of the pair of beams of reference and test-sample light issuing from the polarizing beam splitter 4 finally become equalized, and the contrast of interference fringes which are formed by overlaying the test-sample light and the reference light one on the other is maximized, thus heightening the accuracy of measurement. Generally, the intensity of a beam is reduced after the beam has passed through various optical elements. The values of intensity of the reference and test-sample light necessarily differ from each other if the arrangement of optical elements disposed on the reference light optical path and the orthtomic polarized wave surface is changed. Accordingly, it is preferable to control the intensity value ratio of beams divided by the polarizing beam splitter 4 by anticipating the intensity variations occurring on the reference optical path and the orthtomic polarized wave surface in order to equalize the intensity ratio of the pair of beams of reference and test-sample light issuing from the polarizing beam splitter 4. For this purpose, as described above, the azimuths of the one-half wave plate 2 and the polarizer 3 may be adjusted such that the polarization of a beam is set to be in a given direction in relation to the orthogonally polarizing surface of the polarizing beam splitter 4. If a beam emitted from the light source 1 is linearly polarized light, the direction of polarization thereof may be controlled by suitably arranging the disposition of the light source 1 (more concretely, the light source 1 is rotated around its optical axis) or by using polarization plane rotating elements and the like. If a beam emitted from the light source 1 is circularly polarized light, it may be changed into a beam of linearly polarized light by a one-fourth wave plate, etc., and the direction of polarization of this beam may be thereafter controlled. Conversely, the direction of the orthogonally polarizing surface of the polarizing beam splitter 4 may be controlled for this purpose.

The function of the one-half wave plate 2 and the polarizer 3 according to the present invention is to minimize the loss of the amount of light of a beam having random planes of polarization which is emitted from the light source 1 such as an eximer laser, for example, a beam of elliptically polarized light, and to remove detrimental components of this beam, thus linearly polarizing and introducing this beam into the polarizing beam splitter 4. Accordingly, the one-half wave plate 2 is disposed such that the direction of polarization of the polarizer 3 which is disposed in a given relationship with the polarizing beam splitter 4 as described above corresponds to the longitudinal axial direction of the ellipse of the elliptically polarized light.

As shown in FIG. 1, the optical system has other components which are: a phase element 12 formed of double-refraction crystal and the like for providing a constant phase difference between the test-sample light and the reference light; polarizers 13 and 14 each extracting polarized components of the test-sample light and the reference light which vibrate in a direction which is common to these beams of light; image forming lenses 15 and 17 through which beams of reference and test-sample light having passed through the polarizers 13 and 14 are led to light receiving means 19 and 21 such as image pickup elements or CCDs; a frame memory means 23 for memorizing the output of each light receiving means 19 and 21; and a calculating means 24.

In this embodiment, the polarized components vibrating in the same direction are extracted by the polarizer 13 from the reference and test-sample light which has passed through the non-polarizing beam splitter 11, and the beams thereby obtained interfere with each other. These interfering beams are led to the light receiving means 19 through the image forming lens 15.

The first axis of the phase element 12 (the first optical axis of the crystal) of a phase angle is adjusted to the plane of polarization of the reference light, so that a phase difference value which is different from that of the beam which has passed through the non-polarizing beam splitter 11 is provided between beams of reference and test-sample light reflected by the non-polarizing beam splitter 11. That is, each beam of reference and test-sample light led to the light receiving means 19 undergoes a phase change of phase angle of 0 relative to each other (it does not undergo change). Then the polarizer 14 extracts beams of light having polarized components vibrating in the same direction. They interfere with each other and are led to the light receiving means 21 through the image forming lens 17.

According to the arrangement of this embodiment, the light receiving surface of the light receiving means 19 and the entrance pupil of the test-sample lens 7 are in conjugate relationship with each other, and the light receiving surface of the light receiving means 21 and the entrance pupil of the test-sample lens 7 are also in the same relationship.

It is assumed here that, with respect to beams of reference and test-sample light which have passed through the non-polarizing beam splitter 11, the value of the phase difference between these beams at a point on the light receiving surface of the light receiving means 19 is $\phi(\gamma)$. This point optically corresponds to a point on the entrance pupil surface of the test-sample lens 7 through which the test-sample light in these beams has passed. Then, the value of light intensity $I_{19}$ at the interference between these beams is:

$$I_{19} = A\{1 + \cos \phi(\gamma)\} \quad (1)$$

where A represents an amount which depends on the light intensity of the light source and r represents the co-ordinate of a point on the entrance pupil of the test-sample lens 7 when the origin is assumed to be on the optical axis thereof. More definitely, it is assumed that the two-dimensional co-ordinate (x, y) is defined on the entrance pupil surface of the test-sample lens 7 such as to locate the origin (0, 0) at the point of intersection of this surface and the optical axis. Then r represents any point of the two-dimensional co-ordinate (x, y). Thus, $\phi(r) = \phi(x, y)$. The meridional direction is ordinarily considered to correspond to the y-direction (perpendicular to the plane of the paper) and the sagittal direction to the x-direction (parallel with the plane of the paper).

Similarly, when beams of reference and test-sample light reflected by the non-polarizing beam splitter 11 interfere with each other, the value of light intensity thereof at a point on the light receiving surface of the light receiving means 21 which corresponds to the above-described point on the entrance pupil surface of the test-sample lens 7 is represented by:

$$I_{21} = A\{1 + \cos(\phi(\gamma) - \alpha)\} \quad (2)$$

since the phase angle of the phase element 12 is $\alpha$. In this embodiment, the value of the phase angle $\alpha$ is optionally set to be, for example, $\alpha = \pi 2$. This value may preferably be $\alpha = \pi 2$ (n is an integral number), in consideration of the calculating process which is thereafter carried out by calculating means 24.

Figure 2:
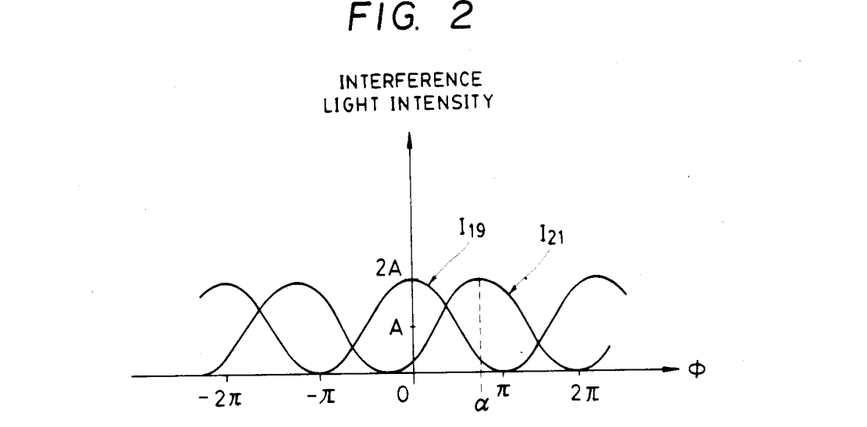
FIGS. 2 and 3 are diagrams showing the value of intensity of light on a light receiving surface in accordance with interference between reference light and test-sample light in the arrangement according to the present invention.

For reference, FIG. 2 shows the variation of the values $I_{19}$ and $I_{21}$ of interference light intensity.

According to the arrangement of this embodiment, as described above, the value of phase difference $\phi(\gamma)$ can be obtained by the formulas (1) and (2) independently of the coefficient A relative to the output of the light source, that is, independently of output fluctuations of the light source. The optical performance of the test-sample lens, namely, the wavefront aberration can be measured by obtaining the value of phase difference $\phi(\gamma)$ over the entire area of the entrance pupil of the test-sample lens 7.

In the arrangement of this embodiment, the output from a given position on each of the light receiving means 19 and 21 is memorized in the frame memory 23, and the outputs from corresponding positions are used for a calculation of the values $I_{19}$ and $I_{21}$ of the interference light intensity, in accordance with the above equations, by the calculating means 24.

In this arrangement, the light receiving surface of each of the light receiving means 19 and 21 is disposed in conjugate relationship with the entrance pupil of the test-sample lens 7, but these are not necessarily disposed in such a manner for the purpose of performing measurement. If the beams of reference and test-sample light are provided in the form of a parallel bundle of rays, it is unnecessary to provide the image forming lenses 15 and 17 in addition to this conjugate relationship. However, when the small types of components are applied as the light receiving means 19 and 21, it is preferable to dispose condenser lenses in front of the light receiving means 19 and 21 in order that these means may receive desirable beams in accordance with the area of the light receiving surface thereof. The image forming lenses according to the arrangement of this embodiment have the function of such condenser lenses also.

For the purpose of improving the contrast of interference fringes, it is preferable for the arrangement to be such that the direction of polarization of each polarizer 13 and 14 adapted for overlaying the reference light and the test-sample light one on the other forms an angle of 45° between itself and the orthogonally polarizing surface of the beams of reference and test-sample light.

The embodiment of the present invention has been described with respect to measurement of a lens, but the object of measurement is not limited to lenses. Various optical elements such as prisms, transparent plane-parallel plates from which such elements are formed, reflecting mirrors such as convex and concave mirrors, and the like may be tested by this arrangement, and it is possible to measure various wavefront aberrations due to the ununiformity of surface accuracy, a refractive index or the like. The interference apparatus shown in FIG. 1 and the other apparatuses shown in FIGS. 4 to 6 which will be later described are constituted on the basis of a Twyman-Green interferometer. They may be otherwise constituted on the basis of, for example, a Mach-Zehnder interferometer or a Fizeau interferometer. The reason why this embodiment has been basically constituted by a Twyman-Green interferometer is that the optical paths of the beams of reference and test-sample light have been designed to be equal in length. That is, when a light source such as an eximer laser which emits beams providing a short coherence length is used, it is preferable to constitute the apparatus on the basis of a Twyman-Green interferometer capable of equalizing each optical path length for the purpose of heightening the accuracy in detecting interference fringes.

According to the arrangement of this embodiment, signals supplied from the light receiving means 19 and 21 are memorized in the frame memory 23, and pairs of signals obtained from corresponding points on these means are successively processed by calculation over the entire range of measurement. It is also possible to pick up output signals from corresponding points on the light receiving means 19 and 21 and immediately process these signals by calculation without the medium of the frame memory 23.

The objects of the present invention are thus achieved by the above-described arrangement, but it is more preferable in terms of improvement of accuracy to arrange the apparatus in a manner such as described below.

Figure 3:
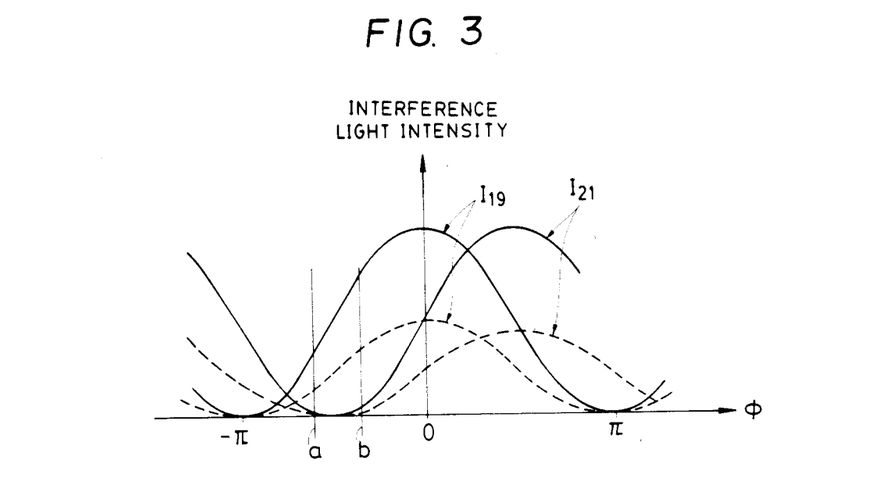

It may be difficult for the phase difference $\phi(\gamma)$ to be measured by the interference apparatus which is shown in FIG. 1, when the coefficient A of the formulas (1) and (2) is changed. For example, when the output of the light source fluctuates and the light intensity $I_{19}$ and $I_{21}$ indicated by the solid lines in FIG. 3 are changed such as indicated by the broken lines, the values of the ratio $I_{19}/I_{21}$ of the light intensity values $I_{19}$ to the light intensity values $I_{21}$ become equal at the positions of the phases $\phi=a$ and $\phi=b$, both ratios thus being substantially the same and indistinguishable. That is, in the process of calculation using the above formulas (1) and (2) by which the phase difference $\phi(\gamma)$ is obtained on the basis of $I_{19}/I_{21}$, the phase difference $\phi$ corresponding to $I_{19}/I_{21}$ is represented by two values a and b so that it is impossible to ascertain which value is the real solution. For the purpose of resolving this problem, the value of the coefficient A may previously be measured or the number of formulas representing the light intensity may be increased. It is thus possible to eliminate such a disadvantage.

Figure 4:
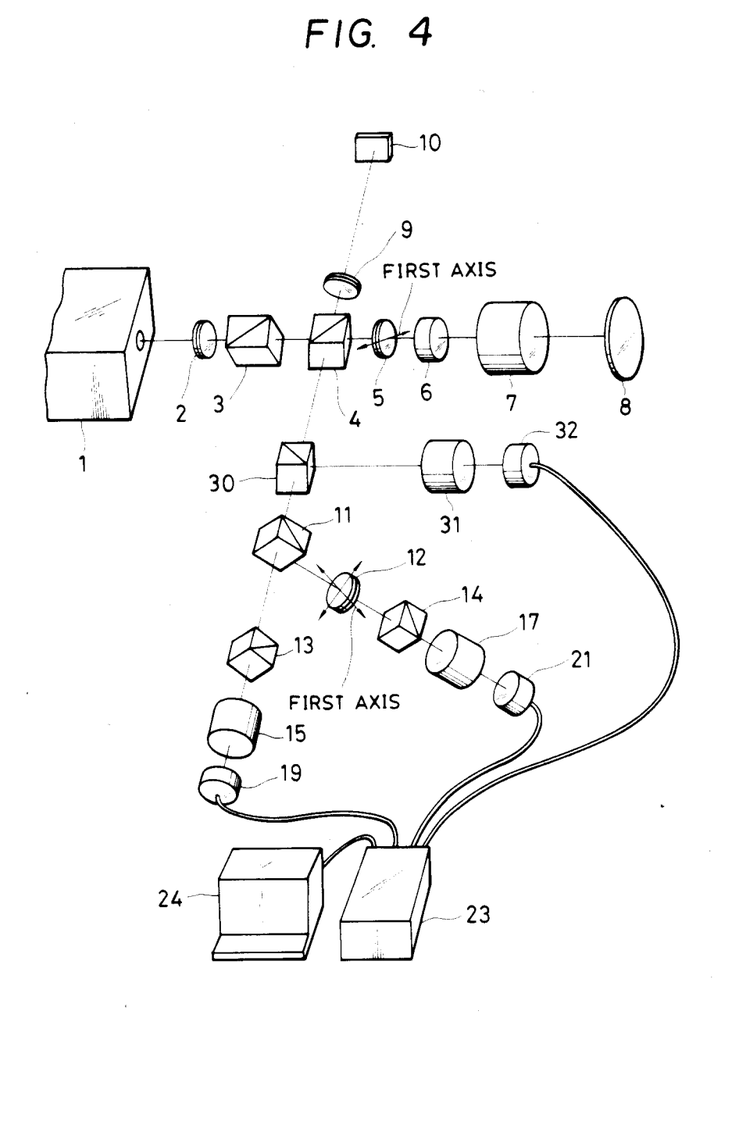
FIG. 4 is a schematic diagram showing the optical system of an interference apparatus which is another embodiment of the present invention and which has a function of monitoring the output from a light source.
Figure 5:
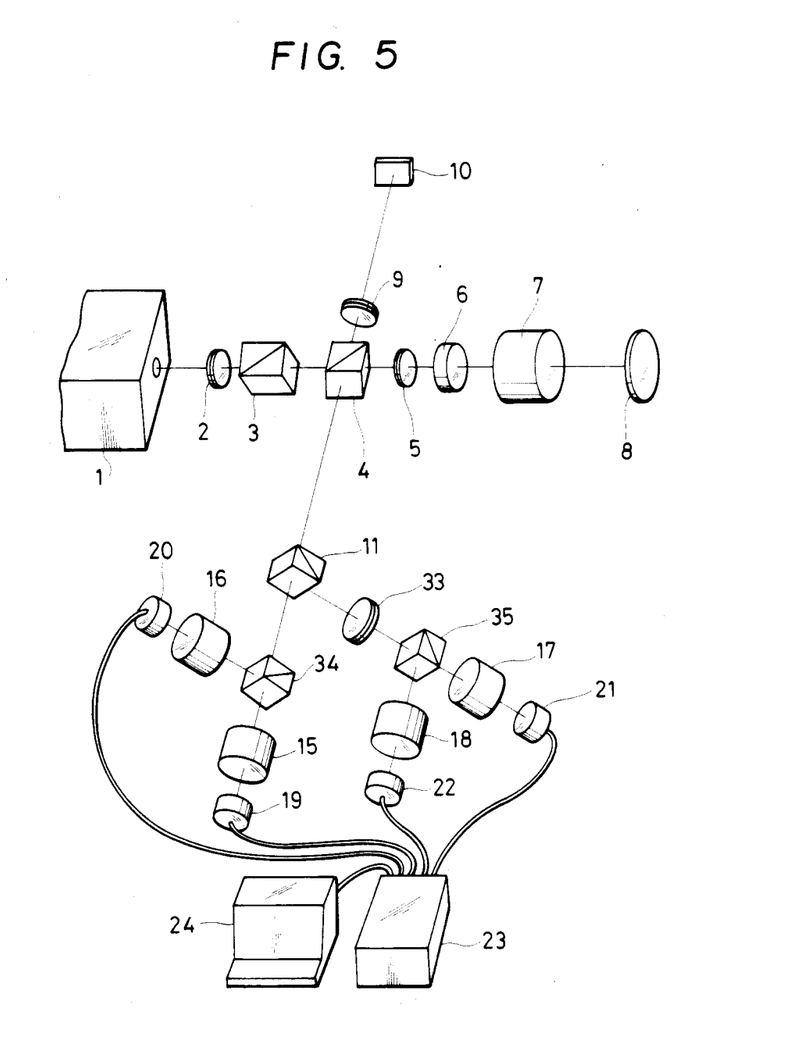
FIGS. 5 and 6 are schematic diagrams showing optical systems of interference apparatuses which are further embodiments of the present invention and each of which has more than two pairs of light receiving means.

FIGS. 4 and 5 schematically show the optical systems in second and third embodiments of the present invention which are further improved in accuracy by refining a part of the arrangement of the first embodiment shown in FIG. 1.

According to the arrangement of the second embodiment shown in FIG. 4, a non-polarizing beam splitter 30 is disposed between the polarizing beam splitter 4 and the non-polarizing beam splitter 11. A part of each beams of reference and test-sample light is reflected by the non-polarizing beam splitter 30 and led through an image forming lens 31 to a light receiving means 32 without interfering with each other, thus measuring the light intensity thereof. The coefficient A in the formulas (1) and (2) relative to the output from the light source is thereby calculated by calculating means 24 from signals received from frame memory 23. According to this method, the phase difference $\phi(\gamma)$ can be obtained over a phase range of $-\pi \leq \phi(\gamma) < \pi$ independently of the value of the coefficient A.

Other components and dispositions are the same as those provided in the first embodiment.

In the third embodiment shown in FIG. 5, the phase element 12 provided in the first embodiment is replaced with a one-fourth wave plate 33, and the polarizers 13 and 14 are replaced with polarizing beam splitters 34 and 35 having the same functions as those of the polarizers 13 and 14 and having the function of splitting beams. Pairs of beams of reference and test-sample light are respectively introduced into the polarizing beam splitter 34 and 35 and are splitted doubly while polarized light components vibrating in the same direction are extracted. Pairs of interfering beams thereby reflected are respectively led to light receiving means 20 and 22 through image forming lenses 16 and 18. On the other hand, pairs of interfering beams having passed are respectively led to the light receiving means 19 and 21 through the image forming lenses 15 and 17.

According to the arrangement of this embodiment, the light receiving means 20 and the light receiving means 22 are respectively in conjugate relationship with the entrance pupil of the test-sample lens 7.

Let the outputs of the light receiving means 20 and 22 be $I_{20}$ and $I_{22}$. Since there is antiphase relationship between the outputs $I_{19}$ and $I_{20}$ and between the outputs $I_{21}$ and $I_{22}$, $I_{20}$ and $I_{22}$ are obtained from the above formulas (1) and (2).

$$I_{20} = A\{1 - \cos \phi(\gamma)\}$$

$$I_{22} = A\{1 - \cos (\phi(\gamma) - \alpha)\} \quad (3)$$

Since the phase angle of $\alpha$ the one-fourth wave plate 33 is $\pi/2$, formulas (1), (2) and (3) are rearranged as follows:

$$I_{19} = A\{1 + \cos \phi(\gamma)\}$$

$$I_{20} = A\{1 - \cos \phi(\gamma)\}$$

$$I_{21} = A\{1 + \sin \phi(\gamma)\}$$

$$I_{22} = A\{1 - \sin \phi(\gamma)\}. \quad (4)$$

The unknowns are A and $\phi(\gamma)$ in the formulas (4). Thus, the phase difference $\phi(\gamma)$ can be obtained from the formulas (4). As is similar to the effect of the second embodiment, the value $\phi(\gamma)$ can be definitely obtained over a range of $-\pi \leq \phi < \pi$. According to this arrangement, it is possible to perform measurement with high accuracy at a high speed. Other components of this embodiment are the same as those of the first embodiment. The one-fourth wave plate 33 may be replaced with a wave plate having an optional phase angle, and the polarising beam splitters 34 and 35 may be replaced with non-polarizing beam splitters while a phase angle is given by means such as the above-described phase elements to each of beams separated by the non-polarizing beam splitter.

Figure 6:
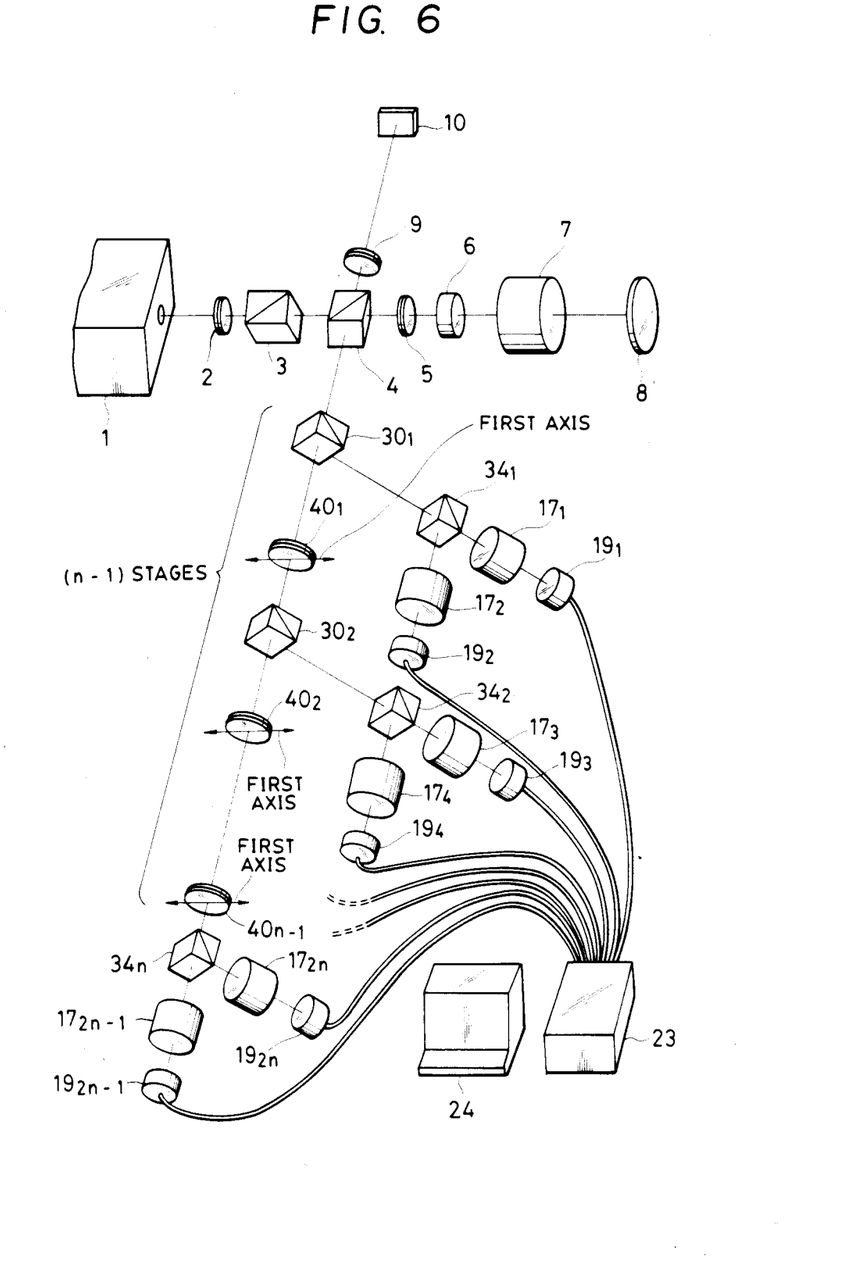

FIG. 6 schematically shows the optical system of a fourth embodiment according to the present invention which is an extended version of the first embodiment capable of performing measurement with higher accuracy and in which a pair of beams of reference and test-sample light introduced from the polarizing beam splitter 4 to the non-polarizing beam splitters 30 diverge into 2n optical paths; different values of phase difference are provided between beams of reference and test-sample light on each optical path; and the beams of reference and test-sample light thereafter interfere with each other, thus obtaining interfering light. Let phase elements for providing phase difference be 40i (i=1, 2, 3, ... n−1), and the phase angles of the phase elements 40i be $\pi/n$. Then, the output $I_i$ supplied from positions on each light receiving means $19_i$ (i=1, 2, 3, ... n−1) which correspond to points on light receiving surfaces thereof such as described above are calculated by calculating means 24 as follows:

$$I_1 = A\{1 + \cos \phi (\gamma)\}$$

$$I_2 = A\{1 - \cos \phi (\gamma)\}$$

$$I_3 = A\{1 + \cos (\phi (\gamma) - \pi/n)\}$$

$$I_4 = A\{1 - \cos (\phi (\gamma) - \pi/n)\}$$

$$\vdots$$

$$I_{2n-1} = A\left(1 + \cos\left(\phi(\gamma) - \frac{n-1}{n}\pi\right)\right)$$

$$I_{2n} = A\left(1 - \cos\left(\phi(\gamma) - \frac{n-1}{n}\pi\right)\right).$$

Other following formulas are the same as those provided in the first embodiment.

Thus, a plurality of formulas are used in this embodiment. Accordingly, it is possible for the phase difference $\phi(\gamma)$ to be averaged by increasing the detection number and to be detected consistently with high accuracy even when the output of the light source corresponding to the coefficient A fluctuates.

In the embodiment shown in FIGS. 1 to 6, a one-half wave plate or an azimuthal element may be interposed between the polarizing beam splitter 4 and the non-polarizing beam splitter 11 or $30_1$ so as to properly rotate the planes of polarization of incident beams. It is thereby possible to dispose the reference light plane mirror 10, the concave mirror 8 and component parts following the polarizing beam splitter 4 on the same plane, thus simplifying the design and the adjustment step.

As described above, the present invention specifically employs beams of polarized light. That is, according to the present invention, it is necessary to split a pair of reference and test-sample beams into a plurality of pairs of reference and test-sample beams and to differentiate the value of phase difference given to each pair of reference and test-sample beams constituting these plurality of pairs. For this reason, it is necessary to provide phase difference between reference and test-sample beams which constitute each pair of beams. One of the most suitable methods simple and effective for controlling phase difference is to provide a phase shift between a P-component and an S-component by means of a phase element, etc. From this viewpoint, according to the present invention, the reference and test-sample beams are previously formed as beams of linearly polarized light (P-component and S-component) perpendicular to each other, thus simplifying the phase differentiating step and the constitution of the optical system.

According to the present invention, a beam formed by reference and test-sample light diverges into a plurality of optical paths, and a differentiated value of phase difference is given to a pair of reference and test-sample beams on each optical path. These beams thereafter interfere with each other, and the state of the interference thereof is measured. This arrangement enables the phase difference between the reference and test-sample beams to be detected with high accuracy even when the output of a light source is fluctuated. The optical performance of, for example, a test-sample lens can be thereby obtained correctly.

It is possible to realize an interference apparatus of a type detecting the state of wave surfaces which is capable of measuring the optical performance of a test-sample lens with consistently high accuracy by one shot of light emitted from, for example, a pulse-oscillation source even when the phase of the reference beam, for example, is fluctuated by atmospheric temperature change or external vibrations. The method according to the present invention is thus suitable for apparatuses using eximer lasers or the like.

Moreover, it is not necessary for the apparatus according to the present invention to move or vibrate mirrors etc. with high accuracy as it used to be in conventional apparatuses of a phase modulation type, thus eliminating the need for finely moving mechanisms, driving means or the like included in the conventional arrangement and enabling measurement to be performed with high accuracy in a stable system. The outputs of the plurality of light receiving means may be processed by frame memories, calculating means, external computers, etc., and high-speed measurement may be possible, according to the present invention.

What is claimed is:

1. An interference apparatus for detecting the state of a wave surface comprising:
    optical means for supplying a test-sample light and a reference light;
    monitoring means for picking up a portion of a light beam composed of said test-sample light and said reference light and for detecting the intensity of the picked-up portion of the light beam;
    light dividing means for dividing the light beam composed of the test-sample light and the reference light so as to form a first light beam composed of the test-sample light and the reference light and a second light beam composed of the test-sample light and the reference light;
    phase differentiating means disposed in the path of at least one of said first and second light beams and capable of causing a difference between the phase difference between said test-sample light and said reference light in said first light beam and that in said second light beam;
    first interference means for effecting interference between said test-sample light and said reference light in said first light beam;
    second interference means for effecting interference between said test-sample light and said reference light in said second light beam;
    first photoelectric conversion means for receiving he light from said first interference means and converting the received light into a signal;
    second photoelectric conversion means for receiving the light from said second interference means and converting the received light into a signal; and
    means for detecting the state of wave surface of said test-sample light in accordance with the signals from said first and second photoelectric conversion means and a signal from said monitoring means.

2. An interference apparatus according to claim 1, wherein said optical means includes:
    a laser;
    a beam splitter for splitting the light from said laser into two light beams; and
    first and second reflecting mirrors disposed on the paths of said light beams and capable of directing the respective light beams to said beam splitter;
    wherein a lens to be tested is disposed in the path of one of said two light beams which constitutes said test-sample light while the other light beam constitutes a reference light, said test-sample light and said reference light being superposed by said beam splitter in such a manner that they do not interfere with each other.

3. An interference apparatus according to claim 2, further comprising a lens system for realizing a conjugate relation between the light-receiving surfaces of said first and second photoelectric conversion means with respect to the pupil of said lens to be tested.

4. An interference apparatus according to claim 2, wherein said laser is an excimer laser.

5. An interference apparatus for detecting the state of the wave surface of a light which has passed a lens to tested, comprising:

light dividing means for dividing a light beam emerging from said lens to be tested and composed of a test-sample light and a reference light so as to form a first light beam composed of the test-sample light and the reference light and a second light beam composed of the test-sample light and the reference light;

phase differentiating means disposed in the path of at least one of said first and second light beams and capable of causing a difference between the phase difference between said test-sample light and said reference light in said first light beam and that in said second light beam;

first interference means for causing said test-sample light and said reference light of said first light beam to interfere with each other;

first photoelectric conversion means for receiving the light from said first interference means and converting the received light into a signal;

second interference means for causing said test-sample light and said reference light of said second light beam to interfere with each other;

second photoelectric conversion means for receiving the light from said second interference means and converting the received light into a signal;

optical means for realizing a conjugate relation between the light-receiving surfaces of said first and second photoelectric conversion means with respect to the pupil of said lens to be tested; and means for detecting the state of wave surface of said test-sample light in accordance with the signals from said first and second photoelectric conversion means.

6. An interference apparatus according to claim 5, wherein said test-sample light and said reference light are formed from a light beam emitted from an excimer laser.

7. An interference apparatus according to claim 5, wherein said optical means includes lens systems disposed in the paths of said first light beam and said second light beam independently.

8. An interference apparatus according to claim 5, further comprising control means for controlling the ratio of intensity between said test-sample light and said reference light.

* * * * *

UNITED STATES PATENT AND TRADEMARK OFFICE
CERTIFICATE OF CORRECTION

PATENT NO. : 4,798,468
DATED : January 17, 1989
INVENTOR(S) : CHIDANE OHUCHI

It is certified that error appears in the above-identified patent and that said Letters Patent is hereby corrected as shown below:

Abstract, line 17, "layer" should read --laser--.

Column 5, last line, "$\alpha = \pi 2$" should read --$\alpha = \pi/2$--.

Column 6, first line, "$\pi 2$" should read --$\pi/n$--.

Column 8, line 26, "of $\alpha$" should read --$\alpha$ of--.

Signed and Sealed this

Sixth Day of June, 1989

Attest:

DONALD J. QUIGG

Attesting Officer

Commissioner of Patents and Trademarks